US010912160B2

(12) United States Patent
Chen et al.

(10) Patent No.: US 10,912,160 B2
(45) Date of Patent: Feb. 2, 2021

(54) COOKING APPLIANCE

(71) Applicant: WHIRLPOOL CORPORATION, Benton Harbor, MI (US)

(72) Inventors: Juan Chen, Svartinge (SE); Vince Huang, Shenzhen Guangdong (CN); Shirley Mao, Shenzhen Guandong (CN); Roy Qiu, Shenzhen Guandong (CN); Tracy Yu, Shenzhen (CN)

(73) Assignee: Whirlpool Corporation, Benton Harbor, MI (US)

( * ) Notice: Subject to any disclaimer, the term of this patent is extended or adjusted under 35 U.S.C. 154(b) by 245 days.

(21) Appl. No.: 16/039,821

(22) Filed: Jul. 19, 2018

(65) Prior Publication Data

US 2020/0029402 A1 Jan. 23, 2020

(51) Int. Cl.
*H05B 6/64* (2006.01)
*H05B 6/80* (2006.01)
*A47J 37/00* (2006.01)

(52) U.S. Cl.
CPC .................................. *H05B 6/6411* (2013.01)

(58) Field of Classification Search
CPC ................................ H05B 6/6411; H05B 6/80
USPC ....... 219/754, 745, 709, 750, 749, 752, 753, 219/762, 756, 685, 404, 715; 99/325, 99/331, 423, DIG. 14; 333/228, 231; 108/20
See application file for complete search history.

(56) References Cited

U.S. PATENT DOCUMENTS

| | | | |
|---|---|---|---|
| 2,742,612 | A | 4/1956 | Cohn |
| 2,956,143 | A | 10/1960 | Schall |
| 2,958,754 | A | 11/1960 | Hahn |
| 2,981,904 | A | 4/1961 | Ajoka et al. |
| 3,260,832 | A | 7/1966 | Johnson |
| 3,265,995 | A | 8/1966 | Hamasaki |
| 3,430,023 | A | 2/1969 | Tingley |
| 3,440,385 | A | 4/1969 | Smith |
| 3,489,135 | A | 1/1970 | Astrella |
| 3,536,129 | A | 10/1970 | White |
| 3,639,717 | A | 2/1972 | Mochizuki |
| 3,731,035 | A | 5/1973 | Jarvis et al. |
| 3,737,812 | A | 6/1973 | Gaudio et al. |
| 3,812,316 | A | 5/1974 | Milburn |
| 4,000,390 | A | 12/1976 | Graff |
| 4,088,861 | A | 5/1978 | Zwillinger |
| D248,607 | S | 7/1978 | Yamamura et al. |
| 4,101,750 | A | 7/1978 | Doner |
| 4,107,502 | A | 8/1978 | Tanaka et al. |

(Continued)

FOREIGN PATENT DOCUMENTS

| | | |
|---|---|---|
| CN | 1523293 A | 8/2004 |
| CN | 101118425 | 2/2008 |

(Continued)

*Primary Examiner* — Quang T Van
(74) *Attorney, Agent, or Firm* — Price Heneveld LLP

(57) ABSTRACT

A cooking appliance includes a bottom plate and a turntable. The bottom plate defines an aperture that receives the turntable such that the turntable is flush-mounted with the bottom plate to provide a floor of a cooking cavity as substantially continuous. A rotary hub engages with an underside of the turntable to transmit rotational motion to the turntable from a motor. The turntable includes a first material and the bottom plate includes a second material.

19 Claims, 4 Drawing Sheets

(56) References Cited

U.S. PATENT DOCUMENTS 4,136,271 A 1/1979 Tanaka et al.
4,139,828 A 2/1979 Commault et al.
4,143,646 A 3/1979 Sampsel et al.
4,166,207 A 8/1979 Burke
4,196,332 A 1/1980 MacKay et al.
4,264,800 A 4/1981 Jahnke et al.
4,283,614 A 8/1981 Tanaka et al.
4,321,445 A 3/1982 Kristof et al.
4,354,562 A 10/1982 Newman
4,374,319 A 2/1983 Guibert
D268,079 S 3/1983 Miyake et al.
4,453,064 A * 6/1984 Toyoda ................. A47J 37/046 108/20
4,463,324 A 7/1984 Rolfs
D275,546 S 9/1984 Tanaka et al.
D276,122 S 10/1984 Tanaka et al.
D277,355 S 1/1985 Miyake et al.
4,595,827 A 6/1986 Hirai et al.
D285,893 S 9/1986 Mizuma et al.
4,628,351 A 12/1986 Heo
4,673,800 A 6/1987 Hirai et al.
4,703,151 A 10/1987 Sakamoto
4,743,728 A 5/1988 Nagafusa et al.
D297,698 S 9/1988 Nishikawa et al.
D297,800 S 9/1988 Feil et al.
4,786,774 A 11/1988 Kaminaka
D303,063 S 8/1989 Satake
4,870,238 A 9/1989 Hodgetts et al.
4,886,046 A 12/1989 Welch et al.
4,937,413 A 6/1990 Spruytenburg et al.
4,999,459 A 3/1991 Smith et al.
5,075,525 A 12/1991 Jung
D330,144 S 10/1992 Takebata et al.
5,369,254 A 11/1994 Kwon
D353,511 S 12/1994 Saimen
5,483,045 A 1/1996 Gerling
5,546,927 A 8/1996 Lancelot
5,558,800 A 9/1996 Page
D378,723 S 4/1997 Weiss
5,619,983 A 4/1997 Smith
D385,155 S 10/1997 Weiss et al.
5,735,261 A 4/1998 Kieslinger
5,747,775 A * 5/1998 Tsukamoto ............ A21B 1/245 200/333
5,747,781 A * 5/1998 Kim ..................... H05B 6/6482 219/685
5,831,253 A 11/1998 Han et al.
5,878,910 A 3/1999 Gibernau et al.
D411,074 S 6/1999 Sakai et al.
5,919,389 A 7/1999 Uehashi et al.
5,928,540 A 7/1999 Antoine et al.
5,973,305 A 10/1999 Kim et al.
5,981,929 A 11/1999 Maeda et al.
6,018,158 A 1/2000 Kang
6,054,696 A 4/2000 Lewis et al.
6,057,535 A 5/2000 Derobert et al.
6,097,019 A 8/2000 Lewis et al.
6,268,593 B1 7/2001 Sakai
6,359,270 B1 3/2002 Bridson
6,429,370 B1 8/2002 Norte et al.
6,557,756 B1 5/2003 Smith
6,559,882 B1 5/2003 Kerchner
6,582,038 B2 6/2003 Moreno-Olguin et al.
D481,582 S 11/2003 Seum et al.
6,664,523 B1 12/2003 Kim et al.
6,696,678 B2 2/2004 Hudson et al.
D495,556 S 9/2004 Milrud et al.
6,853,399 B1 2/2005 Gilman et al.
D521,799 S 5/2006 Ledingham et al.
D522,801 S 6/2006 Lee
D527,572 S 9/2006 Lee et al.
7,105,787 B2 9/2006 Clemen, Jr.
7,111,247 B2 9/2006 Choi et al.
D530,973 S 10/2006 Lee et al.
D531,447 S 11/2006 Lee et al.
D532,645 S 11/2006 Lee
7,193,195 B2 3/2007 Lundstrom et al.
D540,105 S 4/2007 Lee et al.
D540,613 S 4/2007 Jeon et al.
D550,024 S 9/2007 Jeon et al.
7,361,871 B2 4/2008 Cho et al.
D568,675 S 5/2008 Kawata
7,476,828 B2 1/2009 Genua
7,482,562 B2 1/2009 Song et al.
D586,619 S 2/2009 Pino et al.
D587,959 S 3/2009 Hensel
7,556,033 B2 7/2009 Kim
D602,306 S 10/2009 Lavy
7,748,805 B2 7/2010 Lucas et al.
7,770,985 B2 8/2010 Davis et al.
D625,557 S 10/2010 Pino et al.
D626,370 S 11/2010 Baek
7,919,735 B2 4/2011 Kiyono et al.
7,926,313 B2 4/2011 Schenkl et al.
D638,249 S 5/2011 Ryan et al.
8,052,236 B2 11/2011 Kim
8,074,637 B2 12/2011 Yamauchi
8,123,314 B2 2/2012 Becke
D655,970 S 3/2012 De' Longhi
D658,439 S 5/2012 Curtis et al.
D662,759 S 7/2012 Blacken et al.
D663,156 S 7/2012 Curtis et al.
D670,529 S 11/2012 Hensel
D673,000 S 12/2012 De' Longhi
8,322,804 B2 12/2012 Kim
D673,418 S 1/2013 Lee et al.
D678,711 S 3/2013 Reiner
8,389,916 B2 3/2013 Ben-Shmuel et al.
8,455,803 B2 6/2013 Danzer et al.
8,492,686 B2 7/2013 Bilchinsky et al.
8,530,807 B2 9/2013 Niklasson et al.
8,610,038 B2 12/2013 Hyde et al.
8,701,374 B2 4/2014 Becke et al.
8,745,203 B2 6/2014 McCoy
8,803,051 B2 8/2014 Lee et al.
D717,579 S 11/2014 Gregory et al.
9,040,879 B2 5/2015 Libman et al.
D736,554 S 8/2015 Steiner et al.
9,103,581 B2 8/2015 Babinski et al.
D737,620 S 9/2015 Miller et al.
D737,622 S 9/2015 Miller et al.
9,131,543 B2 9/2015 Ben-Shmuel et al.
9,132,408 B2 9/2015 Einziger et al.
9,179,506 B2 11/2015 Sim et al.
9,210,740 B2 12/2015 Libman et al.
9,215,756 B2 12/2015 Bilchinsky et al.
9,351,347 B2 5/2016 Torres et al.
9,374,852 B2 6/2016 Bilchinsky et al.
9,389,012 B2 7/2016 Rackley et al.
D769,669 S 10/2016 Kim et al.
9,518,776 B2 12/2016 Baldo
9,560,699 B2 1/2017 Zhylkov et al.
9,585,203 B2 2/2017 Sadahira et al.
9,903,640 B2 2/2018 Curtis
2001/0025849 A1* 10/2001 Han ..................... H05B 6/6402 219/715
2005/0162335 A1 7/2005 Ishii
2006/0289526 A1 12/2006 Takizaki et al.
2009/0134155 A1 5/2009 Kim et al.
2010/0176121 A1 7/2010 Nobue et al.
2010/0187224 A1 7/2010 Hyde et al.
2011/0031236 A1 2/2011 Ben-Shmuel et al.
2011/0168699 A1 7/2011 Oomori et al.
2011/0290790 A1 12/2011 Sim et al.
2012/0067872 A1 3/2012 Libman et al.
2012/0103972 A1 5/2012 Okajima
2012/0152939 A1 6/2012 Nobue et al.
2012/0160830 A1 6/2012 Bronstering
2013/0048881 A1 2/2013 Einziger et al.
2013/0080098 A1 3/2013 Hadad et al.
2013/0142923 A1 6/2013 Torres et al.
2013/0156906 A1 6/2013 Raghavan et al.
2013/0186887 A1 7/2013 Hallgren et al.
2013/0200066 A1 8/2013 Gelbart et al.

(56) References Cited

U.S. PATENT DOCUMENTS

| | | | |
|---|---|---|---|
| 2013/0277353 | A1 | 10/2013 | Joseph et al. |
| 2014/0062283 | A1 | 3/2014 | Baldo |
| 2014/0197161 | A1 | 7/2014 | Dobie |
| 2014/0203012 | A1 | 7/2014 | Corona et al. |
| 2014/0208957 | A1 | 7/2014 | Imai et al. |
| 2014/0277100 | A1 | 9/2014 | Kang |
| 2014/0287100 | A1 | 9/2014 | Libman |
| 2015/0034632 | A1 | 2/2015 | Brill et al. |
| 2015/0059730 | A1* | 3/2015 | Marcovicz ............ F24C 15/005 126/273 R |
| 2015/0070029 | A1 | 3/2015 | Libman et al. |
| 2015/0136758 | A1 | 5/2015 | Yoshino et al. |
| 2015/0156827 | A1 | 6/2015 | Ibragimov et al. |
| 2015/0173128 | A1 | 6/2015 | Hosokawa et al. |
| 2015/0271877 | A1 | 9/2015 | Johansson |
| 2015/0289324 | A1 | 10/2015 | Rober et al. |
| 2015/0305095 | A1 | 10/2015 | Huang et al. |
| 2015/0334788 | A1 | 11/2015 | Hofmann et al. |
| 2015/0373789 | A1 | 12/2015 | Meusburger et al. |
| 2016/0029442 | A1 | 1/2016 | Houbloss et al. |
| 2016/0088690 | A1 | 3/2016 | Kubo et al. |
| 2016/0119982 | A1 | 4/2016 | Kang et al. |
| 2016/0219656 | A1 | 7/2016 | Hunter, Jr. |
| 2016/0327281 | A1* | 11/2016 | Bhogal ................ H05B 1/0263 |
| 2016/0353528 | A1 | 12/2016 | Bilchinsky et al. |
| 2016/0353529 | A1 | 12/2016 | Omori et al. |
| 2017/0099988 | A1 | 4/2017 | Matloubian et al. |
| 2017/0105572 | A1 | 4/2017 | Matloubian et al. |

FOREIGN PATENT DOCUMENTS

| | | | | |
|---|---|---|---|---|
| CN | 201081287 | Y | | 7/2008 |
| CN | 102012051 | A | | 4/2011 |
| CN | 102620324 | A | | 8/2012 |
| CN | 103156532 | A | | 6/2013 |
| CN | 203025135 | U | | 6/2013 |
| CN | 105042654 | A | | 11/2015 |
| CN | 204987134 | U | | 1/2016 |
| CN | 106103555 | A | | 11/2016 |
| DE | 3238441 | A1 | | 4/1984 |
| DE | 102004002466 | A1 | | 8/2005 |
| DE | 102008042467 | A1 | | 4/2010 |
| EP | 0199264 | A2 | | 10/1986 |
| EP | 0493623 | A1 | | 8/1992 |
| EP | 1193584 | | | 3/2002 |
| EP | 1424874 | A2 | | 6/2004 |
| EP | 1426692 | A2 | | 6/2004 |
| EP | 1471773 | A2 | | 10/2004 |
| EP | 1732359 | A2 | | 12/2006 |
| EP | 1795814 | | | 6/2007 |
| EP | 1970631 | A2 | | 9/2008 |
| EP | 2031938 | A1 | | 3/2009 |
| EP | 2205043 | A1 | | 7/2010 |
| EP | 2230463 | A1 | | 9/2010 |
| EP | 2220913 | B1 | | 5/2011 |
| EP | 2512206 | A1 | | 10/2012 |
| EP | 2405711 | A2 | | 11/2012 |
| EP | 2618634 | A1 | | 7/2013 |
| EP | 2775794 | A1 | | 9/2014 |
| EP | 2906021 | A1 | | 8/2015 |
| EP | 2393339 | B1 | | 12/2016 |
| FR | 2766272 | A1 | | 1/1999 |
| FR | 2976651 | A | | 12/2012 |
| GB | 639470 | A | | 6/1950 |
| GB | 1424888 | | | 2/1976 |
| GB | 2158225 | A | | 11/1985 |
| GB | 2176885 | A | | 1/1987 |
| GB | 2193619 | A | | 2/1988 |
| GB | 2367196 | A | | 3/2002 |
| JP | S55155120 | A | | 12/1980 |
| JP | 57194296 | U | | 12/1982 |
| JP | 59226497 | A | | 12/1984 |
| JP | 02140245 | A | * | 5/1990 |
| JP | H0510527 | A | | 1/1993 |
| JP | H06147492 | A | | 5/1994 |
| JP | 8-171986 | | | 7/1996 |
| JP | 2000304593 | A | | 11/2000 |
| JP | 2008108491 | A | | 5/2008 |
| JP | 2011146143 | A | | 7/2011 |
| JP | 2013073710 | A | | 4/2013 |
| KR | 2050002121 | | | 7/2005 |
| KR | 101359460 | B1 | | 2/2014 |
| KR | 20130093858 | A | | 8/2016 |
| RU | 2122338 | C1 | | 11/1998 |
| RU | 2215380 | C2 | | 10/2003 |
| RU | 2003111214 | A | | 11/2004 |
| RU | 2003122979 | A | | 2/2005 |
| RU | 2088115817 | A | | 10/2009 |
| RU | 2008137844 | A | | 3/2010 |
| WO | 8807805 | A1 | | 10/1988 |
| WO | 0036880 | | | 6/2000 |
| WO | 02065036 | A1 | | 8/2002 |
| WO | 03077601 | A1 | | 9/2003 |
| WO | 2008018466 | A1 | | 2/2008 |
| WO | 2008102360 | A2 | | 8/2008 |
| WO | 2009039521 | A1 | | 3/2009 |
| WO | 2011138680 | A2 | | 11/2011 |
| WO | 2012001523 | A2 | | 1/2012 |
| WO | 2012162072 | | | 11/2012 |
| WO | 2011039961 | A1 | | 2/2013 |
| WO | 2015024177 | A1 | | 2/2015 |
| WO | 2015099648 | A1 | | 7/2015 |
| WO | 2015099650 | A1 | | 7/2015 |
| WO | 2015099651 | A1 | | 7/2015 |
| WO | 2016128088 | A1 | | 8/2016 |
| WO | 2017190792 | A1 | | 11/2017 |

* cited by examiner

COOKING APPLIANCE

FIELD OF THE DISCLOSURE

The present disclosure generally relates to a cooking appliance. More specifically, the present disclosure relates to a cooking appliance having a turntable.

BACKGROUND

Some cooking appliances, such as microwave ovens, are often provided with a rotating turntable. However, these rotating turntables have a tendency to limit a versatility of the cooking appliance. Accordingly, alternative approaches are needed to provide greater versatility to a cooking cavity of the cooking appliances.

SUMMARY

According to a first aspect of the present disclosure, a cooking appliance includes a bottom plate and a turntable. The bottom plate defines an aperture that receives the turntable such that the turntable is flush-mounted with the bottom plate to provide a floor of a cooking cavity as substantially continuous. A rotary hub engages with an underside of the turntable to transmit rotational motion to the turntable from a motor. The turntable and the bottom plate are each made of a ceramic material.

According to a second aspect of the present disclosure, a cooking appliance includes a bottom plate and a turntable. The bottom plate defines an aperture that receives the turntable such that the turntable is flush-mounted with the bottom plate to provide a floor of a cooking cavity as substantially continuous. A rotary hub engages with an underside of the turntable to transmit rotational motion to the turntable from a motor. The turntable and the bottom plate are each made of a non-metallic material.

According to a third aspect of the present disclosure, a cooking appliance includes a bottom plate and a turntable. The bottom plate defines an aperture that receives the turntable such that the turntable is flush-mounted with the bottom plate to provide a floor of a cooking cavity as substantially continuous. A rotary hub engages with an underside of the turntable to transmit rotational motion to the turntable from a motor. The turntable includes a first material and the bottom plate includes a second material.

These and other aspects, objects, and features of the present disclosure will be understood and appreciated by those skilled in the art upon studying the following specification, claims, and appended drawings.

DETAILED DESCRIPTION

Figure 2:
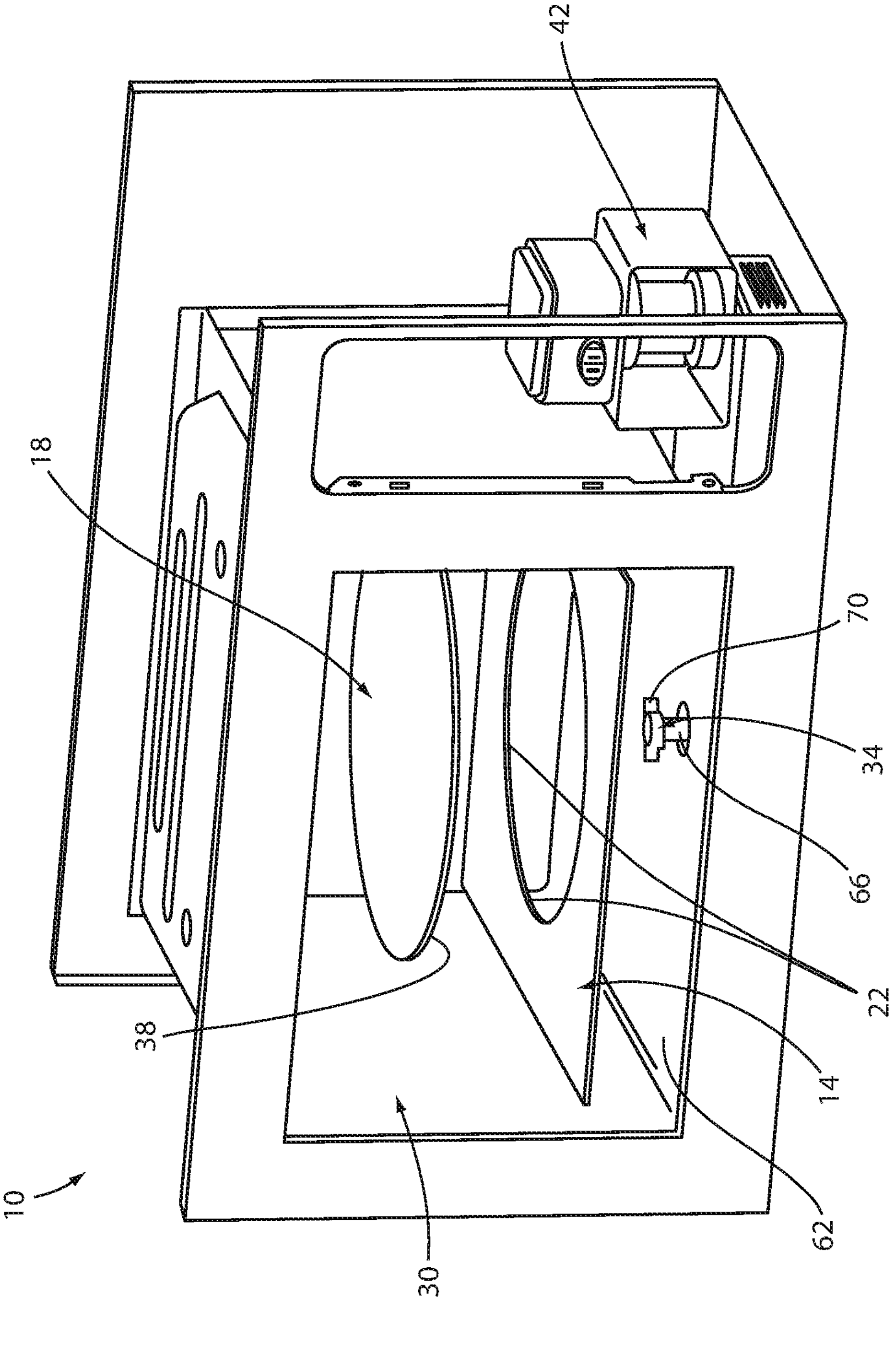
FIG. 2 is a front perspective view of the cooking appliance, illustrating a turntable and a bottom plate separated from one another, according to one example.

For purposes of description herein, the terms "upper," "lower," "right," "left," "rear," "front," "vertical," "horizontal," and derivatives thereof shall relate to the concepts as oriented in FIG. 2. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a cooking appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1:
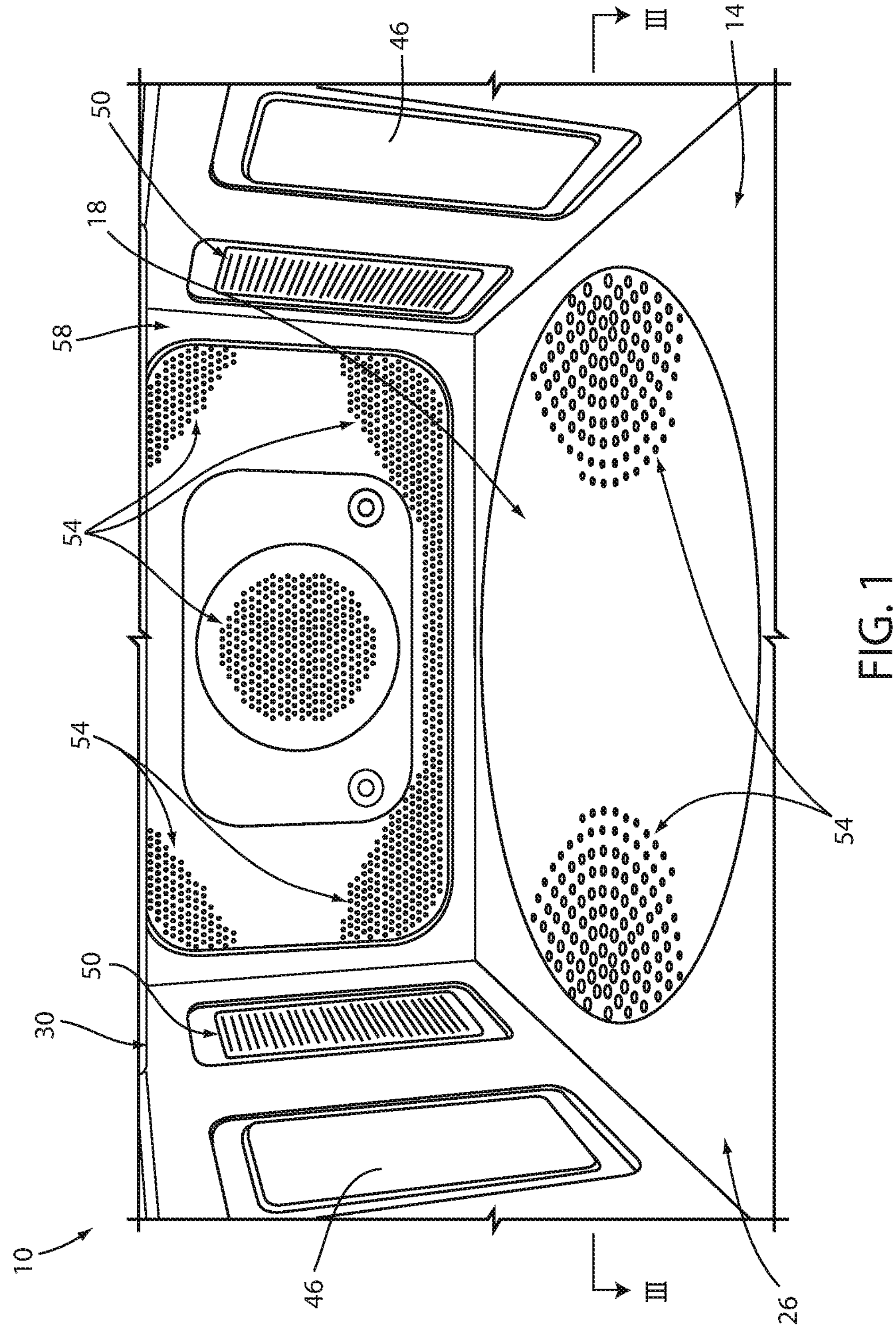
FIG. 1 is a front perspective view of a cooking cavity in a cooking appliance, according to one example.
Figure 3:
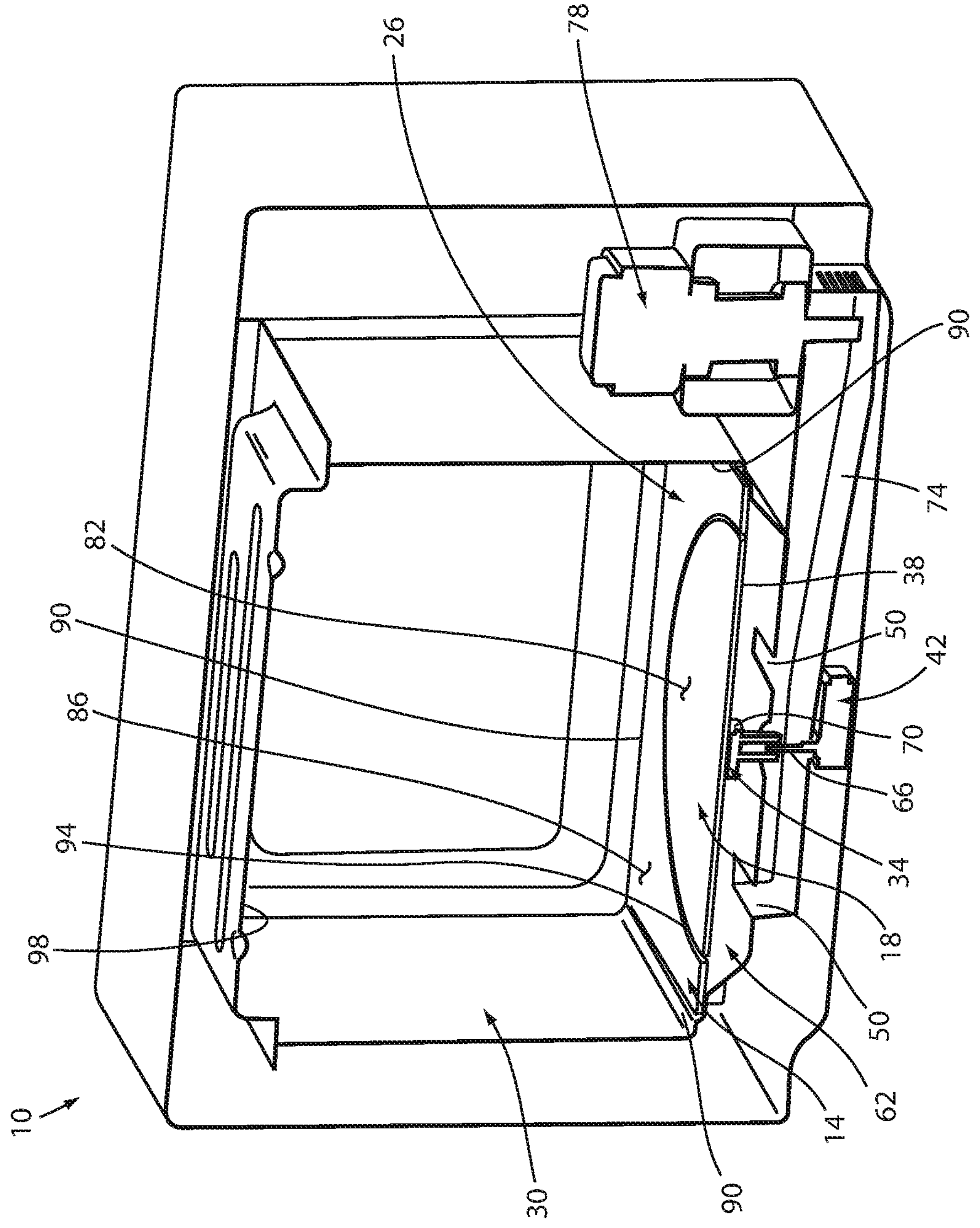
FIG. 3 is a cross-sectional view of the cooking appliance taken along line III-III of FIG. 1, illustrating an engagement between the turntable and a rotary hub, according to one example.

Referring to FIGS. 1-3, a cooking appliance 10 includes a bottom plate 14 and a turntable 18. The bottom plate 14 defines an aperture 22 that receives the turntable 18. The turntable 18 is flush-mounted within the aperture 22 of the bottom plate 14. When assembled, the bottom plate 14 and the turntable 18 provide a floor 26 of a cooking cavity 30 of the cooking appliance 10. A benefit of the flush-mounting of the turntable 18 to the bottom plate 14 is that the floor 26 of the cooking cavity 30 is provided as substantially continuous. A rotary hub 34 engages with an underside 38 of the turntable 18 to transmit rotational motion to the turntable 18 from a motor 42. In various examples, the turntable 18 is made of a first material and the bottom plate 14 is made of a second material.

Referring again to FIG. 1, the cooking cavity 30 is provided with one or more light sources 46 that illuminate the cooking cavity 30 to enable a user to see within the cooking appliance 10. The light sources 46 may illuminate when an access door of the cooking appliance 10 is opened. The cooking cavity 30 is also provided with one or more waveguides 50 that can aid in directing heating or cooking energy to the cooking cavity 30 of the cooking appliance 10 to heat or cook the foodstuff. A series of vent holes 54 may be provided in a rear wall 58 of the cooking cavity 30 as well as the turntable 18 to vent exhaust heat and aromas from the cooking cavity 30. The vent holes 54 can aid in cooling the cooking appliance 10 after a heating cycle is completed by a user. Alternatively, the vent holes 54 may be sized and configured to be additional waveguides 50 that direct the heating or cooking energy into the cooking cavity 30 while also providing the venting function from exhaust heat and aromas. In some examples, microwave energy can be directed from a microwave energy source to the cooking cavity 30 such that the microwave energy enters the cooking cavity 30 through openings in at least one of a wall of the cooking cavity and a bottom or floor of the cooking cavity 30. For example, the microwave energy can enter through the waveguides 50 and/or the vent holes 54 when the vent holes 54 are sized and configured to permit passage of the microwave energy.

Referring now to FIG. 2, the cooking appliance 10 is shown with the bottom plate 14 and the turntable 18 separated from one another in an exploded view. The rotary hub 34 is positioned in a central region of a bottom side 62 of the cooking cavity 30. The rotary hub 34 includes a vertical post 66 and a coupler 70. The rotary hub 34 passes through the bottom side 62 to engage with the underside 38 of the turntable 18. More specifically, the coupler 70 of the rotary hub 34 engages with the underside 38 of the turntable 18. The underside 38 of the turntable 18 may be provided with a complementary structure to that of the coupler 70 that is configured to receive the coupler 70 in a mating fashion. As discussed above, the turntable 18 may be made of a first material and the bottom plate may be made of a second material. In some examples, at least one of the first material and the second material can include carbon. In some specific examples, the first and second material may be selected from the group consisting of polymers and crystalline oxides. For example, the bottom plate 14 and/or the turntable 18 may be made of a ceramic material or a plastic.

Figure 5:
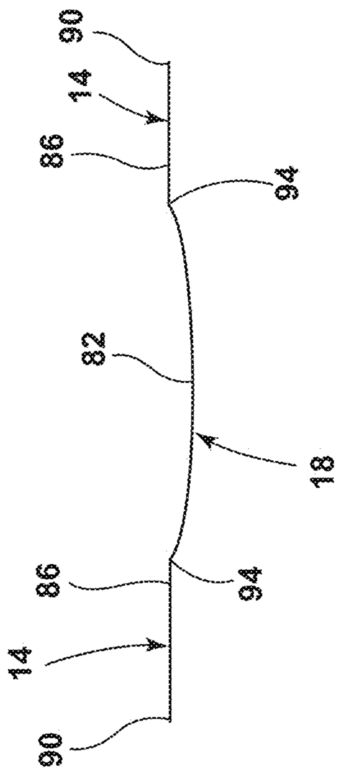
FIG. 5 is a schematic cross-sectional view of the cooking appliance taken along line III-III of FIG. 1, illustrating a profile of the turntable relative to the bottom plate, according to another example.
Figure 4:
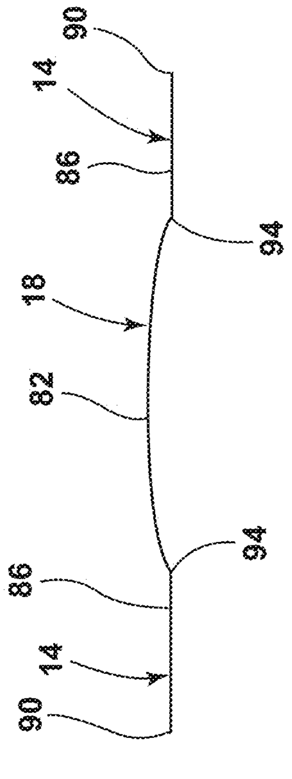
FIG. 4 is a schematic cross-sectional view of the cooking appliance taken along line III-III of FIG. 1, illustrating a profile of the turntable relative to the bottom plate, according to one example.

Referring to FIGS. 3-5 the motor 42 may be positioned directly below the turntable 18. The vertical post 66 extends from the motor 42 to engage with the coupler 70. The coupler 70 can be independent from the turntable 18 such that removal of the turntable 18 from the cooking cavity 30 does not affect the coupler 70. Alternatively, the coupler 70 may be integrally formed with the turntable 18 or otherwise secured to the turntable 18 such that removal of the turntable 18 from the cooking cavity 30 results in removal of the coupler 70 from the cooking cavity 30. In general, the rotary hub 34 includes the vertical post 66 and the coupler 70. The rotary hub 34 may additionally include the motor 42. The bottom side 62 of the cooking cavity 30 may be generally bowl-shaped such that the bottom side 62 is generally recessed relative to the bottom plate 14 and the turntable 18. Said another way, the bottom side 62 of the cooking cavity 30 may suspend the bottom plate 14 above the bottom side 62 and the bottom plate 14 may in turn suspend the turntable 18 above the bottom side 62. The bottom side 62 may define one or more outlets that can be used as the waveguides 50 for directing cooking energy onto an item that a user has placed within the cooking cavity 30 to heat or cook. The waveguides 50 may be structures at a terminal end of one or more wave channels 74. The wave channels 74 may direct cooking energy from an energy source 78 to the cooking cavity 30.

Referring again to FIGS. 3-5, an upper most point of a surface 82 of the turntable 18 can be level or nearly level with an upper most point of a surface 86 of the bottom plate 14. For example, the upper most point of the surface 82 of the turntable 18 can be between about one micrometer and about one millimeter above the upper most point of the surface 86 of the bottom plate 14. In some examples, the turntable 18 may be provided with a concavity to the surface 82 that directs spilled liquids to edges 90 of the floor 26 of the cooking cavity 30. In such examples, a ledge may be provided in the bottom plate 14 that supports the turntable 18 and the ledge may help prevent the spilled liquids from reaching the bottom side 62 of the cooking cavity 30 and ultimately internal components of the cooking appliance 10, such as the motor 42 and the energy source 78. In alternative examples, the turntable may be provided with a convex profile that captures spilled liquid prior to the spilled liquid reaching a junction 94 between the turntable 18 and the bottom plate 14. Accordingly, the ledge in the bottom plate 14 may be omitted and the convex profile of the turntable 18 may be relied upon to prevent the spilled liquid from reaching the bottom side 62 of the cooking cavity 30 and ultimately the internal components of the cooking appliance 10, such as the motor 42 and the energy source 78. In such examples, the junction 94 between the turntable 18 and the bottom plate 14 can be tapered such that the turntable 18 is suspended by the bottom plate 14 by way of an interference fit. In some examples of the present disclosure, the motor 42 may be laterally disposed from the turntable 18 such that the motor 42 is not disposed within the same vertical cross-section as the turntable 18. In such examples, a drive shaft may be employed that extends between the vertical post 66 and the motor 42.

Referring further to FIGS. 3-5 a ceiling 98 of the cooking cavity 30 is substantially parallel to an entirety of the floor 26 of the cooking cavity 30. In examples where the turntable 18 is provided with a concave or a convex profile, then the ceiling 98 of the cooking cavity 30 may not be substantially parallel to an entirety of the floor 26. However, it is contemplated that the concave or convex profile of the turntable 18 may be subtle to the point that the turntable 18 may be contoured while maintaining the floor 26 of the cooking cavity 30 and the ceiling 98 of the cooking cavity 30 as substantially parallel to one another. In various examples of the present disclosure, the bottom plate 14 and/or the turntable 18 can be made of a non-metallic material. For example, the non-metallic material may include carbon. In some specific examples, the non-metallic material may be selected from the group consisting of polymers and crystalline oxides. Alternatively, the polymers and/or crystalline oxides may be coated onto a metallic substrate to provide the bottom plate 14 and the turntable 18 as hybrid components. In one specific example, the bottom plate 14 and the turntable 18 are both made of a ceramic material.

By flush-mounting the turntable 18 relative to the bottom plate 14 a substantially continuous and substantially level floor 26 of the cooking cavity 30 can be provided to a user. A benefit of the substantially continuous and substantially level floor 26 is that the user may place multiple dishes within the cooking cavity 30 in a side-by-side arrangement without negatively affecting the quality or even distribution of heat to the item to be heated or cooked. Additionally, larger dishes may be placed within the cooking cavity 30 without causing the contents of the dish to be displaced to one side or the other as the item is heated or cooked within the cooking cavity 30.

According to various aspects of the present disclosure, an upper most point of a surface of the turntable 18 is between about one micrometer and about one millimeter above an upper most point of a surface of the bottom plate 14. In one example, the turntable 18 can be provided with a concavity that directs spilled liquid to edges of the floor 26 of the cooking cavity 30. In another example, the turntable 18 can be provided with a convex profile that captures spilled liquid prior to the spilled liquid reaching a junction 94 between the turntable 18 and the bottom plate 14. A ceiling 98 of the cooking cavity 30 is substantially parallel to an entirety of the floor 26 of the cooking cavity 30. According to some aspects of the present disclosure, a non-metallic material can be utilized for the manufacture of the bottom plate 14 and/or the turntable 18. For example, the non-metallic material can includes carbon. In one specific example the bottom plate 14 and/or the turntable 18 can be selected from the group consisting of polymers and crystalline oxides. According to various aspect of the present disclosure, the turntable 18 can include a first material and the bottom plate 14 can include a second material. At least one of the first material and the second material can include carbon. In one specific example, the first and second materials are selected from the group consisting of polymers and crystalline oxides. In some examples, the motor 42 can be laterally disposed relative to the turntable 18.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A cooking appliance, comprising:
a bottom plate;
a turntable, the turntable defining vent holes in a surface thereof, the vent holes being positioned at diametrically opposed edges of the turntable;
wherein the bottom plate defines an aperture that receives the turntable such that the turntable is flush-mounted with the bottom plate to provide a floor of a cooking cavity as substantially continuous;
wherein a rotary hub directly engages with an underside of the turntable to transmit rotational motion to the turntable from a motor; and
wherein the turntable and the bottom plate are each made of a ceramic material.

2. The cooking appliance of claim 1, wherein an upper most point of a surface of the turntable is between about one micrometer and about one millimeter above an upper most point of a surface of the bottom plate.

3. The cooking appliance of claim 1, wherein the turntable is provided with a concavity that directs spilled liquid to edges of the floor of the cooking cavity.

4. The cooking appliance of claim 1, wherein the turntable is provided with a convex profile that captures spilled liquid prior to the spilled liquid reaching a junction between the turntable and the bottom plate.

5. The cooking appliance of claim 1, wherein a ceiling of the cooking cavity is substantially parallel to an entirety of the floor of the cooking cavity.

6. A cooking appliance, comprising:
a bottom plate;
a turntable, the turntable defining vent holes in a surface thereof, the vent holes occupying less than half of a surface area of the turntable;
wherein the bottom plate defines an aperture that receives the turntable such that the turntable is flush-mounted with the bottom plate to provide a floor of a cooking cavity as substantially continuous;
wherein a rotary hub engages with an underside of the turntable to transmit rotational motion to the turntable from a motor; and
wherein the turntable and the bottom plate are each made of a non-metallic material, wherein the non-metallic material comprises carbon, and wherein the turntable and the bottom plate are each made entirely of the non-metallic material.

7. The cooking appliance of claim 6, wherein the non-metallic material is selected from the group consisting of polymers and crystalline oxides.

8. The cooking appliance of claim 6, wherein an upper most point of a surface of the turntable is between about one micrometer and about one millimeter above an upper most point of a surface of the bottom plate.

9. The cooking appliance of claim 6, wherein the turntable is provided with a concavity that directs spilled liquid to edges of the floor of the cooking cavity.

10. The cooking appliance of claim 6, wherein the turntable is provided with a convex profile that captures spilled liquid prior to the spilled liquid reaching a junction between the turntable and the bottom plate.

11. The cooking appliance of claim 6, wherein a ceiling of the cooking cavity is substantially parallel to an entirety of the floor of the cooking cavity.

12. A cooking appliance, comprising:
a bottom plate;
a turntable;
wherein the bottom plate defines an aperture that receives the turntable such that the turntable is flush-mounted with the bottom plate to provide a floor of a cooking cavity as substantially continuous;
wherein a rotary hub directly engages with an underside of the turntable to transmit rotational motion to the turntable from a motor; and
wherein the turntable comprises a first material and the bottom plate comprises a second material, wherein the turntable is made entirely of the first material and the bottom plate is made entirely of the second material, and wherein the first material and the second material are each non-metallic materials.

13. The cooking appliance of claim 12, wherein at least one of the first material and the second material comprises carbon.

14. The cooking appliance of claim 12, wherein the first and second materials are selected from the group consisting of polymers and crystalline oxides.

15. The cooking appliance of claim 12, wherein an upper most point of a surface of the turntable is between about one micrometer and about one millimeter above an upper most point of a surface of the bottom plate.

16. The cooking appliance of claim 12, wherein the turntable is provided with a concavity that directs spilled liquid to edges of the floor of the cooking cavity.

17. The cooking appliance of claim 12, wherein the turntable is provided with a convex profile that captures spilled liquid prior to the spilled liquid reaching a junction between the turntable and the bottom plate.

18. The cooking appliance of claim 12, wherein a ceiling of the cooking cavity is substantially parallel to an entirety of the floor of the cooking cavity.

19. The cooking appliance of claim 12, wherein the motor is laterally disposed relative to the turntable.

* * * * *